(No Model.)
L. G. ROWAND.
FIRE ALARM CIRCUIT.
No. 568,495.  Patented Sept. 29, 1896.
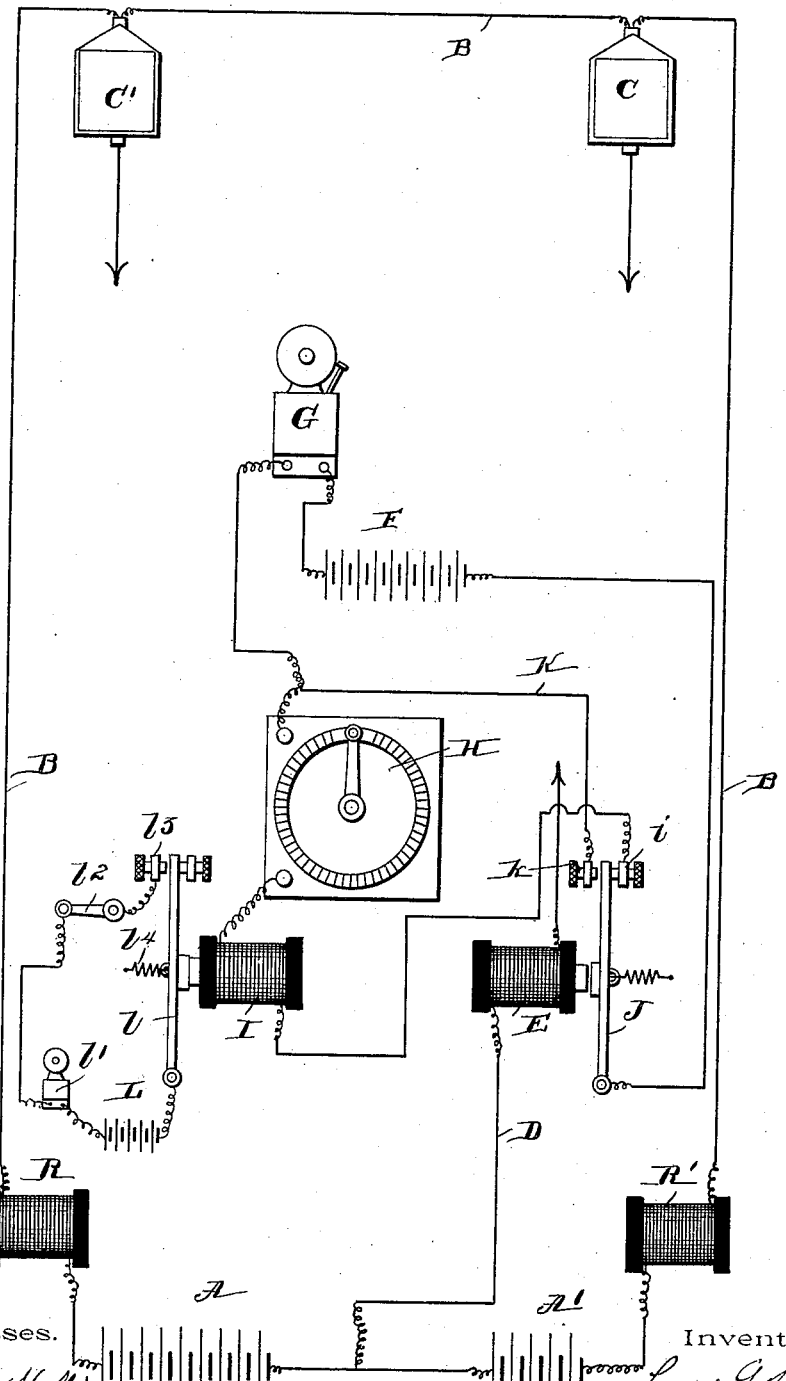
Witnesses.  Inventor.
Jesse B. Heller  Lewis G. Rowand
Philip Bortelje  L. G. Harding
  Attorney.

UNITED STATES PATENT OFFICE.

LEWIS G. ROWAND, OF CAMDEN, NEW JERSEY, ASSIGNOR TO THE UNIVERSAL FIRE ALARM COMPANY, OF SAME PLACE.

FIRE-ALARM CIRCUIT.

SPECIFICATION forming part of Letters Patent No. 568,495, dated September 29, 1896.

Application filed August 13, 1895. Serial No. 559,127. (No model.)

*To all whom it may concern:*

Be it known that I, LEWIS G. ROWAND, a citizen of the United States, residing at Camden, county of Camden, and State of New Jersey, have invented a new and useful Improvement in Fire-Alarm Circuits, of which the following is a full, clear, and exact description, reference being had to the accompanying drawing, which forms a part of this specification.

I will first describe briefly the object and purpose of my invention. In fire-alarms there is provided a main circuit which includes the various signals. This circuit terminates in a central station, from which the signals are sent by relay or transmitting circuit to the various fire-houses.

My invention relates to a class of fire-alarms wherein there is used a metallic-loop circuit provided with a constant ground upon the metallic-loop circuit and a series of ground connections, which are normally open and adapted by devices at that point to be connected with the metallic loop and automatically broken. I also provide in the constant ground connection a magnet which is energized when the normally open ground-circuits are closed. This magnet controls the operation of the transmitting-circuit to the various engine-houses. It is necessary or advisable that this transmitting-circuit should in all cases be a normally-closed circuit, so that the conditions of the wire may be determined; and this invention has for its object so arranging this transmitting-circuit as to make it a normally-closed circuit and at the same time allow it to be properly controlled by this magnet in the constant ground-circuit. Its object is, further, by the construction and means hereinafter fully described, to enable a signal to be given at the main station whenever this transmitting wire or circuit becomes in any way deranged.

In order that the invention may be understood, I will fully describe the embodiment of the same, as illustrated in the accompanying drawing, which clearly illustrates how I carry out this purpose.

The figure is a diagrammatic view showing the circuits and connections.

A A' are the batteries upon the main-line metallic circuit B, upon each side of which and in the main station are the relays R and R'. The batteries A and A' are of unequal strength.

C C' are the two fire-alarm boxes, provided with mechanism for making and breaking and simultaneously therewith grounding the main metallic circuit.

D is a wire connection between the batteries A and A' and having upon it the magnet E, and being finally connected with ground.

F is a battery controlling the fire-gong circuit, one gong G being shown. This circuit normally passes through the gongs in the circuit through a resistance device H, through high-resistance electromagnet I, to binding-post $i$, normally in contact with switch-lever J, and from switch-lever J back to battery. The magnet controlling the gong G is of low resistance and therefore on account of the resistance device H is normally unacted on or not energized, while the magnet I, being high resistance, is normally energized.

K is a shunt-wire connected at one end to the circuit of battery F, between the battery and resistance H, and at the other end connected with the binding-post $k$ in alinement with switch-lever J, so that when it is in contact with lever J the circuit of battery F is short-circuited around resistance H and magnet I, and magnet I is deënergized.

The lever J is pivoted and forms the armature for relay-magnet E, so that when said magnet is energized the lever J is drawn toward it and the gong-circuit completed independent of the resistance H and magnet I, and the gong or gongs are rung.

L is a battery, the circuit passing from one side to pivoted lever $l$, which forms the armature of magnet I, and from the other side through bell $l'$, switch $l^2$, to contact $l^3$, in alinement but normally out of contact with lever $l$, $l^4$ being a spring connected to lever $l$ and bringing and holding it in contact with contact $l^3$ when the magnet I is deënergized. Whenever the mechanism, either box C or C', is operated a circuit is completed upon the wire D and the magnet E energized and the gong-circuit formed independent of resistance H and magnet I and the gong or gongs at the various points on this circuit ring. At the same time, the magnet I being deënergized, the circuit of battery L is closed and bell $l'$ rings. The purpose of magnet I is also to advise the person in charge if for any cause the gong-circuit becomes deranged, for if that should occur at once magnet I would be deënergized and circuit of battery L closed and the bell $l'$ would give warning.

With this construction, as may readily be seen, the circuit which goes from the central station to the various fire-houses is a normally-closed circuit, but at the same time, by reason of the high-resistance devices in said circuit, very little of the battery is used. For this reason the renewal of the battery is to a great extent avoided and its life and certainty of action increased. Moreover, if the wire or circuit becomes deranged in any way, the signal at the engine-house is in no way affected, while a signal is at once given at the central station, which enables the circuit to be repaired.

Having now fully described my invention, what I claim, and desire to protect by Letters Patent, is—

1. In combination with a main circuit, having a constant ground connection and a normally open ground, and a device adapted to make and break said normally open ground, of a magnet in the constant ground, a second circuit normally closed, high-resistance devices in said circuit, and one or more receiving devices of low resistance in said circuit, a shunt about the resistance devices controlled by the magnet in the constant ground of the metallic circuit, and a relay-circuit controlled by the said high-resistance device and containing a receiving device, said relay-circuit being adapted to become operative when the high-resistance device is deënergized.

2. In combination with a main circuit having a constant ground connection and a normally open ground, and a device adapted to make and break said normally open ground, of a magnet in the constant ground, a second circuit normally closed, high-resistance devices in said circuit, and one or more receiving devices of low resistance in said circuit, a shunt about the resistance in said circuit controlled by the magnet in the constant ground of the main circuit.

3. In combination with a main circuit having a constant ground connection and a normally open ground, and a device adapted to make and break said normally open ground, of a magnet in the constant ground, a second circuit normally closed, a high resistance in said circuit, a high-resistance magnet in said circuit, and one or more receiving devices of low resistance in said circuit, a shunt about the resistance and magnet in said second circuit, said shunt being controlled by the magnet in the constant ground of main circuit, a relay-circuit controlled by the high-resistance magnet in the second circuit and adapted to become operative when the high-resistance magnet is deënergized.

In testimony of which invention I have hereunto set my hand.

LEWIS G. ROWAND.

Witnesses:
PHILIP BOUTELJE,
FRANK S. BUSSER.